(12) United States Patent
Osada et al.

(10) Patent No.: US 8,765,312 B2
(45) Date of Patent: Jul. 1, 2014

(54) CONVERTER CONTROLLING APPARATUS

(75) Inventors: Yasuhiro Osada, Nagoya (JP);
Takahiko Hasegawa, Toyota (JP)

(73) Assignee: Toyota Jidosha Kabushiki Kaisha,
Toyota-Shi (JP)

( * ) Notice: Subject to any disclaimer, the term of this patent is extended or adjusted under 35 U.S.C. 154(b) by 401 days.

(21) Appl. No.: 13/375,932

(22) PCT Filed: Jun. 3, 2009

(86) PCT No.: PCT/JP2009/060117
§ 371 (c)(1),
(2), (4) Date: Dec. 2, 2011

(87) PCT Pub. No.: WO2010/140228
PCT Pub. Date: Dec. 9, 2010

(65) Prior Publication Data
US 2012/0086417 A1    Apr. 12, 2012

(51) Int. Cl.
*H01M 8/06* (2006.01)
(52) U.S. Cl.
USPC ...... 429/422; 429/204; 429/DIG. 4; 429/421;
429/434; 429/442; 429/515
(58) Field of Classification Search
USPC ................. 429/21, 22, 24, 26, 204, DIG. 4
See application file for complete search history.

(56) References Cited

U.S. PATENT DOCUMENTS

| | | | | |
|---|---|---|---|---|
| 5,678,410 A | * | 10/1997 | Fujita et al. | 62/7 |
| 5,728,483 A | * | 3/1998 | Fujitani et al. | 429/505 |
| 6,018,469 A | | 1/2000 | Poon | |
| 6,495,025 B2 | * | 12/2002 | Velev | 205/633 |
| 6,534,208 B1 | * | 3/2003 | Zinser | 429/9 |
| 7,169,493 B2 | * | 1/2007 | Molter et al. | 429/422 |
| 7,799,310 B2 | * | 9/2010 | Lackner et al. | 423/522 |
| 8,043,594 B2 | * | 10/2011 | Lackner et al. | 423/431 |
| 2004/0058215 A1 | * | 3/2004 | Bruck et al. | 429/32 |
| 2012/0074919 A1 | | 3/2012 | Hasegawa et al. | |

FOREIGN PATENT DOCUMENTS

| | | |
|---|---|---|
| DE | 69832220 T2 | 7/2006 |
| DE | 112009004843 T5 | 7/2012 |
| JP | H10-094249 A | 4/1998 |
| JP | 2004-201409 A | 7/2004 |

(Continued)

OTHER PUBLICATIONS

International Search Report mailed Aug. 11, 2009 of PCT/JP2009/060117.

(Continued)

*Primary Examiner* — Bao Q Vu
(74) *Attorney, Agent, or Firm* — Kenyon & Kenyon LLP (57) ABSTRACT

A load variation detecting section determines whether or not the actual load variation falls below a load variation threshold stored in a memory. If a load variation detecting section determines that a specific time period (for example, one minute) has elapsed since the actual load variation fell below a load variation threshold, a power supply section applies same power to reactors for the respective phases. On the other hand, a heat dissipation property calculating section measures temperature-rise rates of the elements for the respective phases, ranks the rates in order from the one having a higher heat dissipation property, and notifies the priority drive phase determining section of the result. A priority drive phase determining section chooses a phase having the highest heat dissipation property as a priority drive phase.

2 Claims, 5 Drawing Sheets

(56) References Cited

FOREIGN PATENT DOCUMENTS

| | | |
|---|---|---|
| JP | 2004-201463 A | 7/2004 |
| JP | 2006-311776 A | 11/2006 |
| JP | 2006-340476 A | 12/2006 |
| JP | 2006-340535 A | 12/2006 |
| JP | 2007-159315 A | 6/2007 |
| JP | 2008-017564 A | 1/2008 |
| JP | 2008-043146 A | 2/2008 |
| JP | 2008-245348 A | 10/2008 |
| WO | 2005/076433 A1 | 8/2005 |
| WO | 2006098376 A | 9/2006 |

OTHER PUBLICATIONS

Office Action dated on Jun. 20, 2013, issued for corresponding German Patent Application No. 112009004850.1.

* cited by examiner

CONVERTER CONTROLLING APPARATUS

This is a 371 national phase application of PCT/JP2009/060117 filed 3 Jun. 2009, the contents of which are incorporated herein by reference.

TECHNICAL FIELD

The present invention relates to a converter controlling apparatus for controlling an output voltage of a fuel cell.

BACKGROUND ART

For an on-board fuel cell system for automobiles and the like, various hybrid fuel cell systems provided with both a fuel cell and a battery as a power source have been proposed for addressing situations such as rapid load variation beyond the power generating capacity of a fuel cell.

In a hybrid fuel cell system, the output voltage and others of the fuel cell are controlled by a DC-DC converter. A widely used DC-DC converter for such control is of a type that operates switching elements, such as power transistors, IGBTs, or FETs, in a PWM fashion to convert a voltage. With the advance of electronic equipment of smaller size with less power consumption and higher performance, there is a demand for a DC-DC converter with a faster speed, a larger capacity, and reduced ripples. In order to meet such a demand, a multiphase DC-DC converter is conventionally used, which is made up of multiple DC-DC converters connected in parallel to each other (see Patent Literature 1).

CITATION LIST

Patent Literature

[Patent Literature 1] Japanese Patent Laid-Open No. 2006-340535

SUMMARY OF INVENTION

Technical Problem

In a conventional multiphase DC-DC converter, drive phase switching control (for example, switching control from single phase drive to multiphase drive) is performed depending on the size of the load. In the case of a multiphase DC-DC converter having U, V, and W phases, for example, the drive phase switching control to be performed depending on the size of the load includes single phase drive in which only the U phase is used, two phase drive in which the U and V phases are used, and three phase drive in which U, V, and W phases are used.

As described above, in a conventional multiphase DC-DC converter, a prioritized phase over other phases (in the above example, U phase; hereinafter referred to as "priority drive phase") is fixed. Therefore, one of the problems is that if the fixedly set priority drive phase is prone to overheat compared to other phases (in other words, the phase is of poor heat dissipation property), output regulation must be imposed frequently under low load conditions.

The present invention has been made in view of the above circumstances, and it is an object of the invention to provide a converter controlling apparatus capable of suppressing output regulation under low load conditions or the like by appropriately setting a priority drive phase.

Solution to Problem

In order to attain the above object, a converter controlling apparatus according to the present invention is a controlling apparatus for a multiphase converter provided with a plurality of phases for controlling an output voltage of a fuel cell, the apparatus comprising: measurement means for measuring heat dissipation property of each of the phases during power generation in the fuel cell; setting means for setting a priority drive phase based on a measurement result from the measurement means; and switching control means for controlling phase switching so that the priority drive phase is used with priority given to the priority drive phase over other phases.

With this configuration, the heat dissipation property of each of the phases is measured during power generation in the fuel cell, and a priority drive phase to be used with priority given to the priority drive phase over other phases is set based on the measurement result. In this way, it is possible to prevent the problem with the prior art of a fixedly set priority drive phase; in particular, the problem of output regulation that must be imposed frequently under low load conditions because a drive phase that is prone to overheat is set to be a priority drive phase. It is also possible to extend life of components.

In a preferred aspect, in the above configuration, the setting means sets, as a priority drive phase, a phase that has the most excellent heat dissipation property. In a preferred aspect, in the above configuration, the measurement means measures temperature of a switch portion or a reactor portion forming each of the phases.

In a further preferred aspect, in the above configuration, a converter for each of the phases is a soft switching converter including a main boost circuit and an auxiliary circuit, the main boost circuit has a main coil having one end thereof connected to a terminal on a high potential side of the fuel cell, a main switch for switching operation having one end thereof connected to the other end of the main coil and having the other end thereof connected to a terminal on a low potential side of the fuel cell, a first diode having a cathode connected to the other end of the main coil, and a smoothing capacitor provided between an anode of the first diode and the other end of the main switch, the auxiliary circuit has a first series connected section including a second diode and a snubber capacitor that are connected in parallel to the main switch and connected to the other end of the main coil and to a terminal on the low potential side of the fuel cell, and a second series connected section including a third diode, an auxiliary coil, and the auxiliary switch that are connected between a connecting node of the second diode with the snubber capacitor and the one end of the main coil.

Advantageous Effects of Invention

According to the present invention, it is possible to suppress output regulation under low load conditions or the like by appropriately setting a priority drive phase.

DESCRIPTION OF EMBODIMENTS

A. Embodiment

Figure 1:
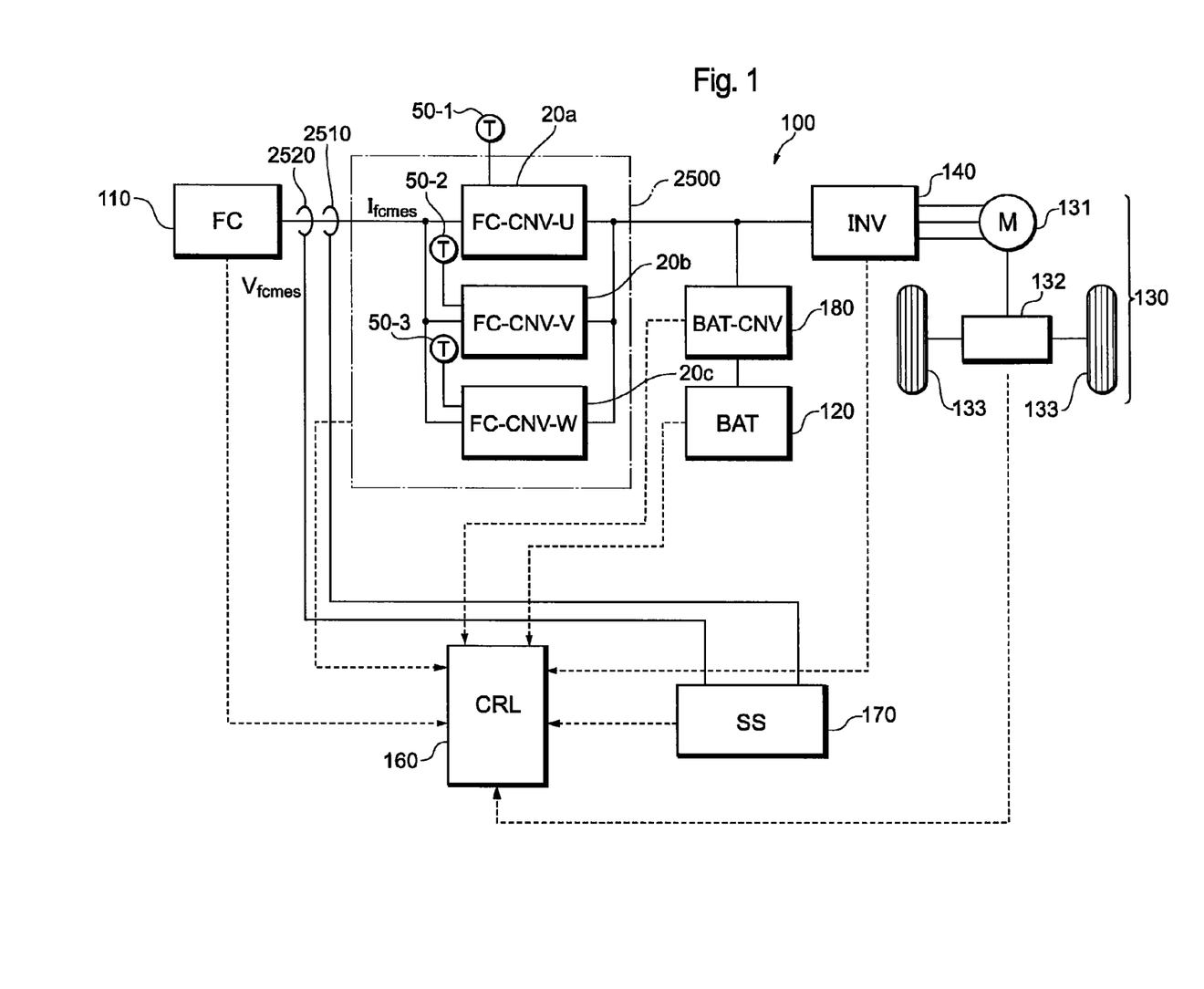
FIG. 1 is a diagram showing a configuration of a hybrid fuel cell system according to an embodiment.

An embodiment of the invention will now be described with reference to the drawings. FIG. 1 shows a configuration of an FCHV system on a vehicle, according to the embodiment. Although a Fuel Cell Hybrid Vehicle (FCHV) is cited as an example of the vehicle in the description below, the embodiment may be applicable to electric vehicles and the like. The embodiment may also be applicable to not only various vehicles (for example, ships, aircrafts, robots, and the like) but also portable fuel cell systems.

A-1. Entire System Configuration

An FCHV system 100 is provided with an FC converter 2500 between a fuel cell 110 and an inverter 140 and is also provided with a DC-DC converter (hereinafter referred to as "battery converter") 180 between a battery 120 and the inverter 140.

The fuel cell 110 is a solid polymer electrolyte cell stack made up of multiple unit cells connected in series. A voltage sensor V0 for detecting an output voltage Vfcmes of the fuel cell 110 and a current sensor I0 for detecting an output current Ifcmes are attached to the fuel cell 110. In the fuel cell 110, an oxidation reaction occurs at an anode in accordance with the equation (1) and a reduction reaction occurs at a cathode in accordance with the equation (2); an electromotive reaction thus occurs in the entire fuel cell 110 in accordance with the equation (3).

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

A unit cell has a structure in which an MEA, which is made up of a polymer electrolyte membrane or the like sandwiched between a fuel electrode and an air electrode, is further sandwiched between separators for supplying a fuel gas and an oxidizing gas. The anode is made up of an anode catalyst layer provided on a porous support layer, and the cathode is made up of a cathode catalyst layer provided on a porous support layer.

The fuel cell 110 is provided with a supply system of fuel gas for the anode, a supply system of oxidizing gas for the cathode, and a feeding system of cooling liquid (all not shown), and can generate a desired electric power by controlling the amount of supply of the fuel gas and the oxidizing gas in response to a control signal from a controller 160.

The FC converter (multiphase converter) 2500 is responsible for controlling the output voltage Vfcmes of the fuel cell 110, and is a two-way voltage converter that converts (boosts or reduces) the output voltage Vfcmes received at the primary side (input side: fuel cell 110 side) into a voltage having a different value from that of the primary side to output it to the secondary side (output side: inverter 140 side) or conversely converts a voltage received at the secondary side into a voltage having a different value from that of the secondary side to output it to the primary side. The FC converter 2500 is used to control the output voltage Vfcmes of the fuel cell 110 so that the voltage corresponds to a target voltage. As shown in FIG. 1, an input current Ifcmes to the FC converter 2500 is detected by the current sensor 2510 and an input voltage Vfcmes is detected by the voltage sensor 2520. An output current and an output voltage of the FC converter 2500 can be detected by a current sensor and a voltage sensor 18 (both not shown) respectively. Additional current sensors may be provided in order to detect a current flowing through a reactor of each phase (hereinafter referred to as "reactor current").

Near switching elements (not shown) of the respective phase of the FC converter 2500, temperature sensors 50 (50-1, 50-2, and 50-3) for detecting temperature of each element are provided in order to evaluate heat dissipation property of each phase. It is not intended to limit the location of the temperature sensors 50 to near switching elements, and the temperature sensors 50 may be located anywhere as long as the heat dissipation property of each phase can be comparatively evaluated.

The battery 120 is connected in parallel to the fuel cell 110 relative to a load 130, and serves as a storage for a surplus electric power, a storage for regenerative energy during regenerative braking, and an energy buffer during load variation in association with acceleration or deceleration of the fuel cell vehicle. The battery 120 that may be used includes a secondary battery such as a nickel-cadmium battery, a nickel-hydrogen battery, and a lithium secondary battery.

The battery converter 180 is responsible for controlling an input voltage to the inverter 140, and has a circuit configuration similar to the FC converter 2500, for example. A boost converter may be used for the battery converter 180, or instead a buck-boost converter capable of boosting and reducing a voltage may be used, and any configuration that allows controlling an input voltage to the inverter 140 may be used.

The inverter 140 is, for example, a PWM inverter driven in a pulse width modulation, and is responsive to a control command from the controller 160 to convert a DC power output from the fuel cell 110 or the battery 120 into a three-phase AC power to control the running torque of a traction motor 131.

The traction motor 131 provides a main motive power for the vehicle, and also generates a regenerative power during deceleration. A differential 132 is a decelerator, and decelerates the high speed rotation of the traction motor 131 to a predetermined number of revolutions and rotates a shaft provided with tires 133. The shaft is provided with a wheel speed sensor (not shown) or the like to sense the speed of the vehicle. In this embodiment, all equipment (including the traction motor 131 and the differential 132) operable with a power supplied from the fuel cell 110 is collectively referred to as the load 130.

The controller 160 is a computer system for controlling the FCHV system 100, and includes, for example, a CPU, a RAM, and a ROM. The controller 160 determines a required power from the load 130 (i.e. a required power from the entire system) with various signal inputs (for example, a signal indicative of the position of a throttle, a signal indicative of the vehicle speed, and signal indicative of the output current or output terminal voltage of the fuel cell 110) supplied from sensors 170.

The required power from the load 130 is, for example, a sum of the power for running the vehicle and the power for auxiliary machinery. The power for auxiliary machinery includes a power consumed by on-board machinery (such as a humidifier, an air compressor, a hydrogen pump, and a cooling water circulation pump), a power consumed by devices required for running the vehicle (such as a transmission, a wheel control device, a steering device, and a suspension), a power consumed by devices located in a passenger space (such as an air conditioner, lighting equipment, and an audio system), and the like.

The controller (converter controlling apparatus) 160 determines a share of an output power between the fuel cell 110 and the battery 120, and calculates a command value for power generation. The controller 160 determines a required power from each of the fuel cell 110 and the battery 120, and then controls the operation of the FC converter 2500 and the battery converter 180 to attain the required power.

A-2. FC Converter Configuration

As shown in FIG. 1, the FC converter 2500 is composed of a U-phase converter 20a for low load, a V-phase converter 20b for medium load, and a W-phase converter 20c for high load. These DC-DC converters for the respective phases have different peaks of power conversion efficiency. In this embodiment, main switches of the respective DC-DC converters 20a to 20c are composed of a different number of switching elements: 2 for low load, 4 for medium load, and 6 for high load, in order to vary the peaks of power conversion efficiency between phases. Of course, it is not intended that the above description is considered as a limitation, and the peaks of power conversion efficiency may be varied between phases by using different volumes of reactors or different capacities of capacitors of the DC-DC converters 20a to 20c.

Figure 2:
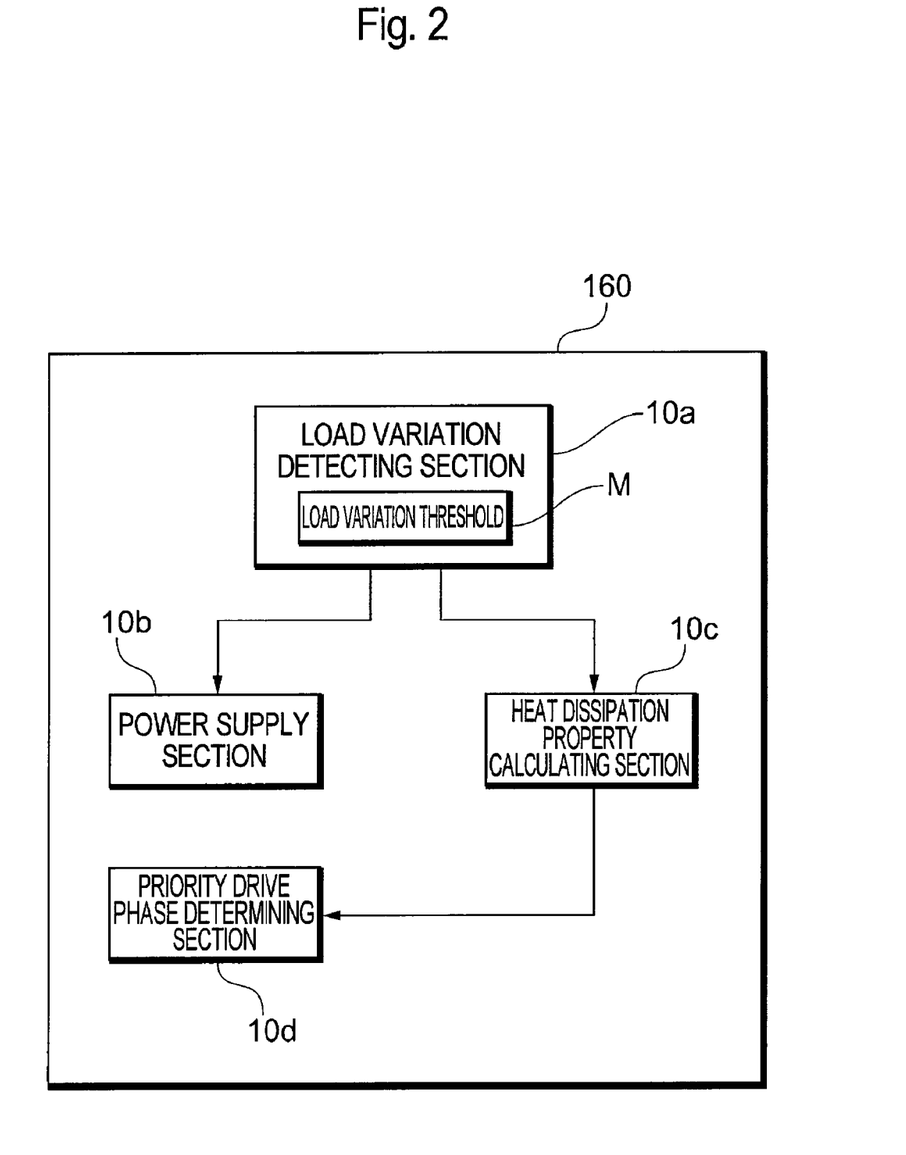
FIG. 2 is a functional block diagram showing a functional configuration of a controller according to the embodiment.

FIG. 2 is a functional block diagram for describing control functionality of an FC converter embodied by the controller 160.

The controller 160 includes and is configured with a load variation detecting section 10a, a power supply section 10b, a heat dissipation property calculating section 10c, and a priority drive phase determining section 10d. The load variation detecting section 10a recognizes variation of power demanded by the load during power generation in the fuel cell 110 (hereinafter referred to as "load variation") based on input information from sensors (for example, a signal indicative of the position of a throttle and a signal indicative of the number of revolutions of the motor), and determines for every predetermined period (for example, whenever the system is operated) whether or not the recognized variation (hereinafter referred to as "actual load variation") falls below a load variation threshold stored in a memory M. If it is determined that a specific time period (for example, one minute) has elapsed since the actual load variation fell below the load variation threshold, the load variation detecting section 10a then notifies the power supply section 10b and the heat dissipation property calculating section 10c. In this case, load variation is sampled over time in advance under an operational condition with less load variation (for example, during startup, idling, constant traveling, or shutting down) to set a load variation threshold based on the sampled result, and the load variation threshold is stored in the memory M in the factory or the like. The load variation value may be fixed, or may be set or modified as necessary by a user during maintenance or the like.

Upon receiving a notice indicating that a specific time period has elapsed since the actual load variation fell below the load variation threshold, the power supply section 10b controls the DC-DC converters for the respective phases so that same power (passing power) is applied to reactors for the respective phases. On the other hand, upon receiving a notice indicating that a specific time period has elapsed since the actual load variation fell below the load variation threshold, the heat dissipation property calculating section (measurement means) 10c measures temperature-rise rates of the elements V(u), V(w), and V(w) based on the temperature of each element for the respective phases Tu (U phase), Tv (V phase), and Tw (W phase) detected by the temperature sensors 50-1, 50-2, and 50-3. The heat dissipation property calculating section 10c then ranks the temperature-rise rates of the elements V(u), V(w), and V(w) in order from slower to faster (in other words, from the one having a higher heat dissipation property), and notifies the priority drive phase determining section 10d of the result.

The priority drive phase determining section (setting means) 10d chooses a phase having the highest heat dissipation property (for example, V phase) as a priority drive phase according to the rank notified from the heat dissipation property calculating section 10c. In a normal operating range of the fuel cell, since the FC converter 2500 is driven with as few phases as possible in order to reduce an energy loss, one priority drive phase is used to drive the FC converter 2500 under low load conditions. Only one priority drive phase may be set, or two or more priority drive phases may be set. The priority drive phase determining section (setting means) 10d may set a first priority drive phase (for example, V phase), a second priority drive phase (for example, U phase), and a third priority drive phase (for example, W phase) according to the rank notified from the heat dissipation property calculating section 10c.

In this way, a phase currently having the best heat dissipation property is set to be a priority drive phase. It is therefore possible to prevent the problem with the prior art of an fixedly set priority drive phase; in particular, the problem of output regulation that must be imposed frequently under low load conditions because a drive phase that is prone to overheat is set to be a priority drive phase.

Causes of heat dissipation property variation of the respective phases include those which do not affect the heat dissipation property ranks depending on operating conditions of the system (i.e. those which is invariable in terms of a trend of variation), such as variation in thickness of applied grease and locations of switching elements (such as upstream or downstream in a cooling water flow channel) as well as those which affect the heat dissipation property ranks depending on operating conditions of the system (i.e. those which is variable in terms of a trend of variation), such as thermal resistance of components. The thermal resistance of components or the like may rapidly exacerbate itself when cracks occur in solder due to extended use or other causes. According to the embodiment, heat dissipation property of each phase is measured when load variation is reduced, and a phase having the best heat dissipation property at the time is set to be a priority drive phase. It is therefore possible to extend life of components.

<Process of Determining a Priority Drive Phase of FC Converter>

Figure 3:
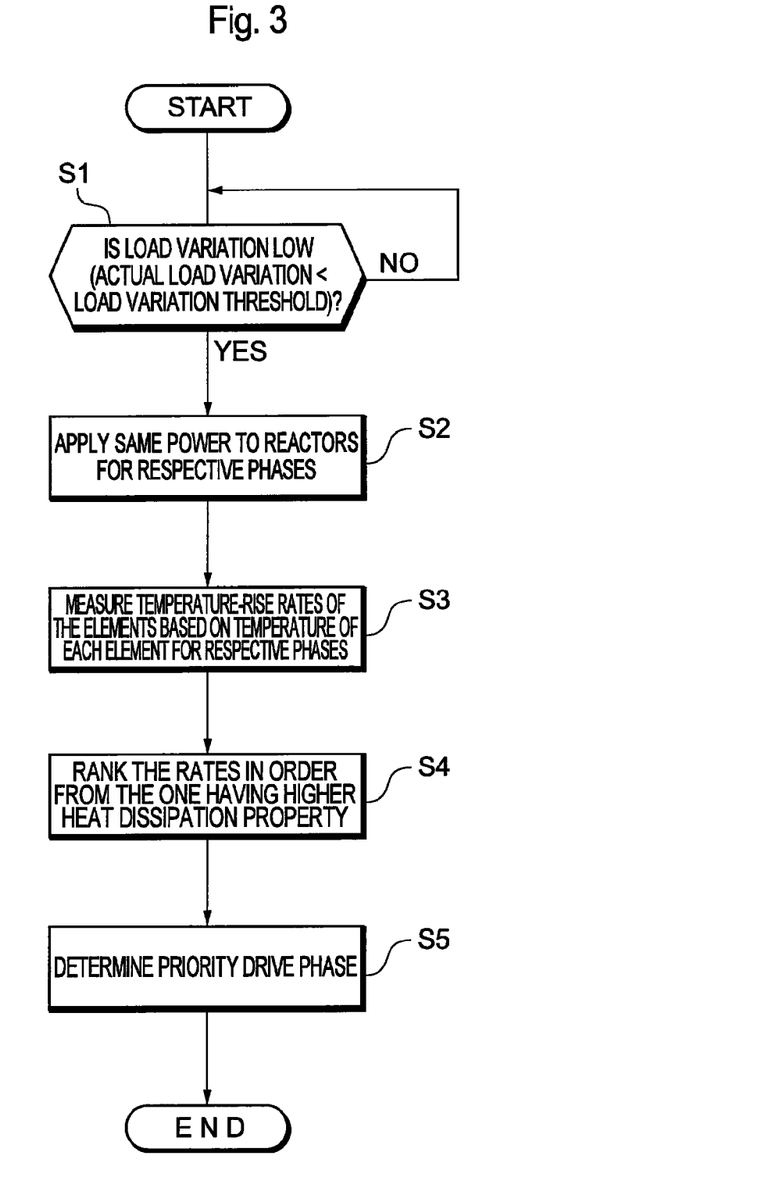
FIG. 3 is a flow chart of a process of determining a priority drive phase of a DC-DC converter according to the embodiment.

FIG. 3 is a flow chart of a process of determining a priority drive phase of the FC converter 2500.

The load variation detecting section 10a of the controller 160 recognizes actual load variation based on input information from sensors (for example, a signal indicative of the position of a throttle and a signal indicative of the number of revolutions of the motor), and determines for every predetermined period (for example, whenever the system is operated) whether or not the actual load variation falls below a load variation threshold stored in a memory M (step S1). If it is then determined that a specific time period (for example, one minute) has elapsed since the actual load variation fell below the load variation threshold (step S1; YES), the load variation detecting section 10a then notifies the power supply section 10b and the heat dissipation property calculating section 10c. On the other hand, if it is determined that the actual load variation is not less than the load variation threshold or that the specific time period has not elapsed yet since the actual load variation fell below the load variation threshold, the load variation detecting section 10a repeats step S1.

Upon receiving a notice indicating that a specific time period has elapsed since the actual load variation fell below the load variation threshold, the power supply section 10b controls the DC-DC converters for the respective phases so that same power (passing power) is applied to reactors for the respective phases (step S2). On the other hand, upon receiving a notice indicating that a specific time period has elapsed since the actual load variation fell below the load variation threshold, the heat dissipation property calculating section 10c measures temperature-rise rates of the elements V(u), V(w), and V(w) based on the temperature of each element for the respective phases Tu (U phase), Tv (V phase), and Tw (W phase) detected by the temperature sensors 50-1, 50-2, and 50-3 (step S3). The heat dissipation property calculating section 10c then ranks the temperature-rise rates of the elements V(u), V(v), and V(w) in order from slower to faster (in other words, from the one having a higher heat dissipation property)(step S4), and notifies the priority drive phase determining section 10d of the result.

The priority drive phase determining section 10d chooses a phase having the highest heat dissipation property (for example, V phase) as a priority drive phase according to the rank notified from the heat dissipation property calculating section 10c (step S5). The priority drive phase determining section 10d generates a converter control signal indicative of the thus determined priority drive phase and outputs the signal to the FC converter 2500, so as to realize phase switching control with which priority is given to the priority drive phase over other phases.

As described above, according to the embodiment, a phase currently having the best heat dissipation property is set to be a priority drive phase. It is therefore possible to prevent the problem with the prior art of an fixedly set priority drive phase; in particular, the problem of output regulation that must be imposed frequently under low load conditions because a drive phase that is prone to overheat is set to be a priority drive phase. It is also possible to extend life of components.

B. Variation

In the above embodiment, a DC-DC converter of a type that operates switching elements such as IGBTs in a PWM fashion to convert a voltage is cited. However, it is not intended to limit the DC-DC converter thereto. As is well known, with the advance of electronic equipment of smaller size with less power consumption and higher performance, there is a demand for a DC-DC converter with a lower loss, higher efficiency, and reduced noises; in particular, there is a demand for reducing switching losses and switching surges in association with the PWM operation.

One technique for reducing such switching losses and switching surges is a soft switching technique. The soft switching is a switching scheme for realizing ZVS (Zero Voltage Switching) or ZCS (Zero Current Switching), and is provided by a typical buck-boost DC-DC converter, which is provided with, for example, inductors, switching elements, and diodes, with an auxiliary circuit added thereto for reducing switching losses (so-called soft switching converter). In this variation, description will be made to the case where a multiphase soft switching converter (hereinafter referred to as a "multiphase FC soft switching converter") is used for a DC-DC converter for controlling a voltage of the fuel cell 110.

Figure 4:
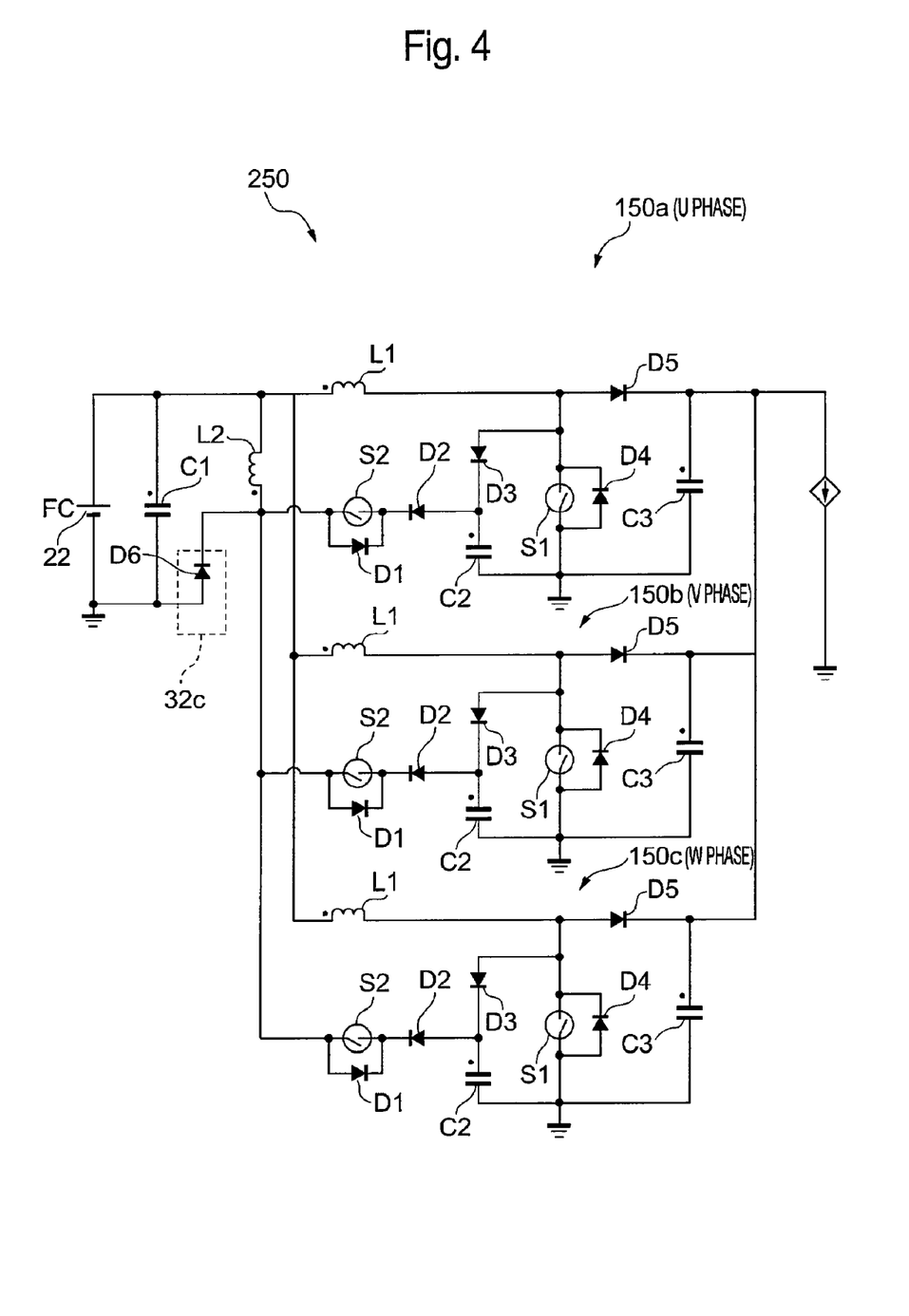
FIG. 4 is a diagram showing a circuit configuration of a multiphase FC soft switching converter according to a variation.

FIG. 4 is a diagram showing a circuit configuration of a multiphase FC soft switching converter 250.

In addition to a U-phase converter 150a, a V-phase converter 150b, and a W-phase converter 150c, the multiphase FC soft switching converter 250 comprises and is configured with a freewheeling circuit 32c (here, a free wheel diode D6). In the description below, when no distinction is needed, a constituent converter for one phase of the FC soft switching converter 250 is simply referred to as "soft switching converter 150". Similarly, an unboosted voltage input to the FC soft switching converter 150 is referred to as "converter input voltage Vin" and a boosted voltage output from the FC soft switching converter 150 is referred to as "converter output voltage Vout".

Figure 5:
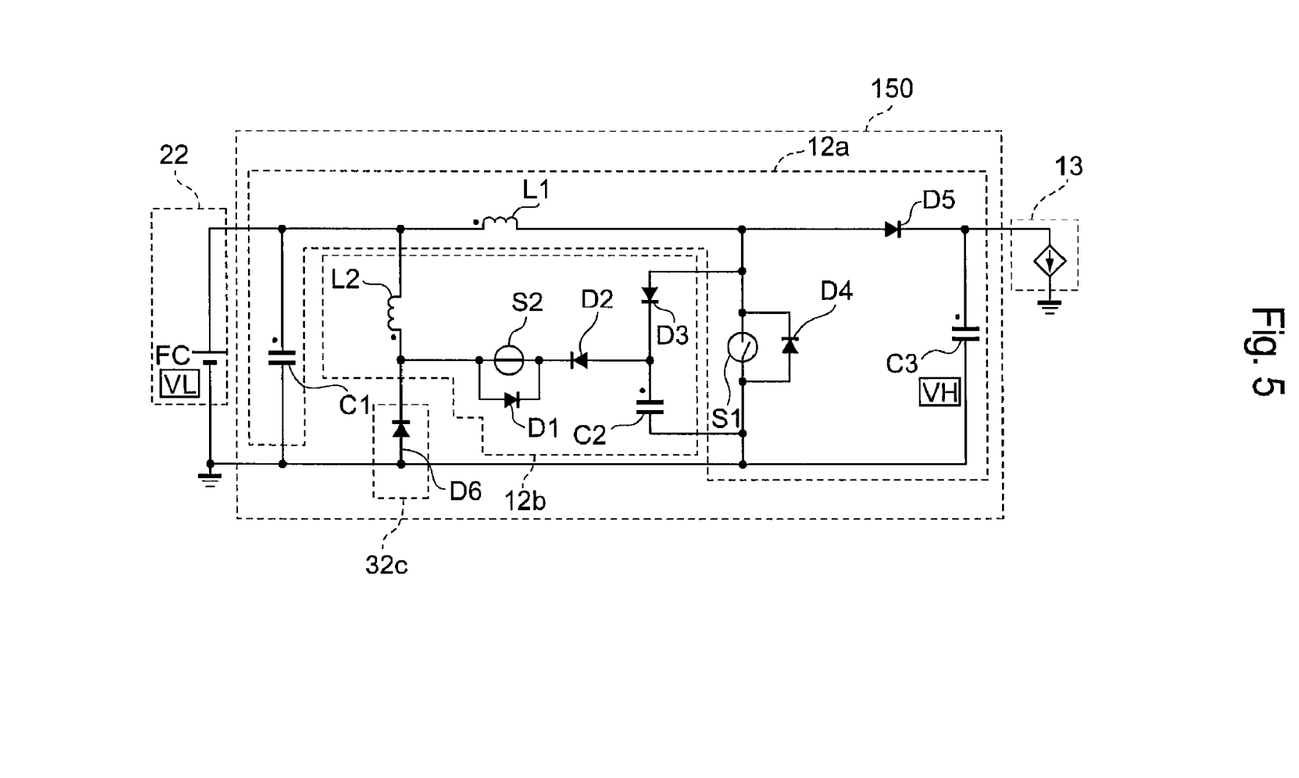
FIG. 5 is a diagram showing a circuit configuration for one phase of a multiphase FC soft switching converter according to the variation.

FIG. 5 is a diagram showing a constituent circuit configuration for one phase (for example, U phase) of the multiphase FC soft switching converter 250.

The FC soft switching converter 150 comprises and is configured with a main boost circuit 12a for boosting operation and an auxiliary circuit 12b for soft switching operation.

The main boost circuit 12a boosts an output voltage of a fuel cell 22 by releasing energy stored in a coil L1 to the load 130 through a diode D5 by means of a switching circuit, which is composed of a main switch S1 consisting of an IGBT (Insulated Gate Bipolar Transistor) or the like and a diode D4, performing switching operations.

Specifically, one end of the coil L1 is connected to a terminal on the high potential side of the fuel cell 22, one end node of the main switch S1 is connected to the other end of the coil L1, and the other end node of the main switch S1 is connected to a terminal on the low potential side of the fuel cell 22. A cathode terminal of the diode D5 is connected to the other end of the coil L1, and a capacitor C3 that functions as a smoothing capacitor is connected between an anode terminal of the diode D5 and the other end of the main switch S1. In the main boost circuit 12a, a smoothing capacitor C1 is provided on the side of the fuel cell 22, and thus ripples in an output current of the fuel cell 22 can be reduced.

In the figure, a voltage VH applied to the capacitor C3 is a converter output voltage Vout of the FC soft switching converter 150, and a voltage VL applied to the smoothing capacitor C1 is an output voltage of the fuel cell 22 and is also a converter input voltage Vin to the FC soft switching converter 150.

The auxiliary circuit 12b includes a first series connected section including a diode D3 connected in parallel to the main switch S1 and a snubber capacitor C2 connected in series with the diode D3. In the first series connected section, a cathode terminal of the diode D3 is connected to the end of the coil L1, and an anode terminal of the diode D3 is connected to one end of the snubber capacitor C2. Further, the other end of the snubber capacitor C2 is connected to a terminal on the low potential side of the fuel cell 22.

The auxiliary circuit 12b also includes a second series connected section made up of a diode D2, a switching circuit that is composed of an auxiliary switch S2 and a diode D1, and an inductance element or coil L2 connected in series. In the second series connected section, an anode terminal of the diode D2 is connected to a connecting node of the diode D3 and the smoothing capacitor C2 in the first series connected section. Further, a cathode terminal of the diode D2 is connected to one end node of the auxiliary switch S2. The other end of the auxiliary switch S2 is connected to the side of one end of the coil L2 common to all phases, and the other end side of the coil L2 is connected to the terminal on the high potential side of the fuel cell 22.

In the thus configured FC soft switching converter 150, a hybrid control section 10 adjusts the switching duty ratio of the main switch S1 to control the boost ratio of the FC soft switching converter 150, namely, a ratio of the converter input voltage Vin to the converter output voltage Vout. Soft switching is realized by switching operation of the auxiliary switch S2 of the auxiliary circuit 12b intervening in switching operation of the main switch S1.

In this variation, the hybrid control section 10 shown in FIG. 4 is used to set and modify a priority drive phase with respect to a U-phase converter 150a, a V-phase converter 150b, and a W-phase converter 150c, which have a configuration as described above. Since such operations can be described in a similar way to the above embodiment, further description will be omitted.

REFERENCE SIGNS LIST 20a, 150a . . . U-PHASE CONVERTER, 20b, 150b . . . V-PHASE CONVERTER, 20c, 150c . . . W-PHASE CONVERTER, 100 . . . FCHV SYSTEM, 110 . . . FUEL CELL, 120 . . . BATTERY, 130 . . . LOAD, 140 . . . INVERTER, 2500 . . . FC CONVERTER, 160 . . . CONTROLLER, 10a . . . LOAD VARIATION DETECTING SECTION, 10b . . . POWER SUPPLY SECTION, 10c . . . HEAT DISSIPATION PROPERTY CALCULATING SECTION, 10d . . . PRIORITY DRIVE PHASE DETERMINING SECTION, M . . . MEMORY, 170 . . . SENSORS, 180 . . . BATTERY CONVERTER, 250 . . . FC SOFT SWITCHING CONVERTER, S1, S2 . . . SWITCHING ELEMENT, C1, C3 . . . SMOOTHING CAPACITOR, C2 . . . SNUBBER CAPACITOR, L1, L2, . . . COIL, D1, D2, D3, D4, D5 . . . DIODE, D6 . . . FREE WHEEL DIODE.

The invention claimed is:

1. A controlling apparatus for a multiphase converter provided with a plurality of phases for controlling an output voltage of a fuel cell, the apparatus comprising:

a measurement device that measures heat dissipation property of each of the phases during power generation in the fuel cell and when load variation is below a threshold;

a setting device that sets a priority drive phase based on a measurement result from the measurement device; and a switching control device that controls phase switching so that the priority drive phase is used with priority given to the priority drive phase over other phases, wherein the setting device sets, as a priority drive phase, a phase that has the most excellent heat dissipation property, and the measurement device measures temperature of a switch portion or a reactor portion forming each of the phases.

2. The converter controlling apparatus according to claim 1, wherein a converter for each of the phases is a soft switching converter including a main boost circuit and an auxiliary circuit, the main boost circuit has a main coil having one end thereof connected to a terminal on a high potential side of the fuel cell, a main switch for switching operation having one end thereof connected to the other end of the main coil and having the other end thereof connected to a terminal on a low potential side of the fuel cell, a first diode having an anode connected to the other end of the main coil, and a smoothing capacitor provided between a cathode of the first diode and the other end of the main switch, and the auxiliary circuit has a first series connected section including a second diode and a snubber capacitor that are connected in parallel to the main switch and connected to the other end of the main coil and to a terminal on the low potential side of the fuel cell, and a second series connected section including a third diode, an auxiliary coil, and an auxiliary switch that are connected between a connecting node of the second diode with the snubber capacitor and the one end of the main coil.

* * * * *